(12) United States Patent
Everitt

(10) Patent No.: US 6,917,278 B1
(45) Date of Patent: Jul. 12, 2005

(54) RESISTOR BANKS

(75) Inventor: Alwyn John Everitt, Wheelcroft (GB)

(73) Assignee: Cressall Resistors Limited, Leicester (GB)

( * ) Notice: Subject to any disclaimer, the term of this patent is extended or adjusted under 35 U.S.C. 154(b) by 173 days.

(21) Appl. No.: 10/110,367

(22) PCT Filed: Oct. 6, 2000

(86) PCT No.: PCT/GB00/03824

§ 371 (c)(1),
(2), (4) Date: Oct. 15, 2002

(87) PCT Pub. No.: WO01/27943

PCT Pub. Date: Apr. 19, 2001

(30) Foreign Application Priority Data

Oct. 9, 1999 (GB) .............................................. 9923847

(51) Int. Cl.⁷ ................................................ H01C 3/00
(52) U.S. Cl. ...................... 338/280; 338/283; 338/315; 338/316; 338/318
(58) Field of Search ................................. 338/280, 283, 338/284, 315, 316, 318, 319

(56) References Cited

U.S. PATENT DOCUMENTS

| | | | | |
|---|---|---|---|---|
| 1,827,508 A | * | 10/1931 | Cope ............................ | 338/284 |
| 2,662,958 A | * | 12/1953 | Flight et al. ................ | 338/291 |
| 2,874,257 A | * | 2/1959 | Kuhn et al. ................... | 338/58 |
| 2,874,258 A | | 2/1959 | Kuhn et al. | |
| 2,969,516 A | * | 1/1961 | Du Bois ..................... | 338/284 |
| 3,027,532 A | * | 3/1962 | Du Bois ..................... | 338/280 |
| 3,697,923 A | * | 10/1972 | Griffes ........................ | 338/280 |
| 4,011,395 A | * | 3/1977 | Beck ........................... | 373/134 |
| 4,316,172 A | | 2/1982 | Luy | |
| 5,157,373 A | * | 10/1992 | Bertram et al. .............. | 338/319 |
| 5,159,310 A | * | 10/1992 | Cummins et al. ............ | 338/280 |
| 5,281,944 A | * | 1/1994 | Kirilloff et al. ............... | 338/280 |
| 5,304,978 A | * | 4/1994 | Cummins et al. ............ | 338/280 |
| 5,686,880 A | * | 11/1997 | Cummins et al. ............ | 338/316 |
| 6,081,183 A | * | 6/2000 | Mading et al. ................ | 338/57 |

FOREIGN PATENT DOCUMENTS

| | | |
|---|---|---|
| EP | 0 676 774 A2 | 10/1995 |
| EP | 0 715 317 A1 | 6/1996 |
| GB | 0 425 043 A | 3/1935 |
| GB | 0 502 708 A | 3/1939 |
| GB | 0 890 837 A | 3/1962 |

* cited by examiner

Primary Examiner—Karl D. Easthom
(74) Attorney, Agent, or Firm—Carr LLP (57) ABSTRACT

A Resistor bank has first and second supporting member. Held on to the supporting members is a resistor element comprising a strip of resistor material which is bent into a zigzag shape. The strip is continuous and has a non-planar cross section profile. A plurality of insulating spacers mounted end to end on each of the first and second supporting members isolate the element from the first and second supporting members. The engaging surfaces of adjacent spacers are of a complimentary shape thereby to enable each spacer to move relative to each adjacent spacer with any flexing of the relevant one of the supporting members. The element is held by a plurality of clips each at a bend thereof on to a respective one of the supporting members. Each clip has at least one fastening lug for insertion into at least one fastening hole in a corresponding bend in the element.

17 Claims, 8 Drawing Sheets

FIG. 11

RESISTOR BANKS

This application is a national stage application filed under 35 U.S.C. 371, claiming priority to International Application No. PCT/GB00/03824, filed on Oct. 6, 2000, which claims priority to UK Patent Application No. 9923847.9 filed on Oct. 9, 1999.

FIELD OF THE INVENTION

The invention relates to resistor banks of the type used in dynamic braking resistor systems for traction vehicles.

BACKGROUND OF THE INVENTION

Electric motor driven traction vehicles, such as trains, trams etc., are known to have two braking devices; a friction braking device comprising, for example, friction blocks or pads applied to the wheels or axles under the control of compressed air or hydraulics, and a dynamic braking device comprising a resistor system which is applied as an electrical load on the traction motor, thereby retarding its rotation.

Dynamic braking resistor systems are known to comprise a number of resistor banks each having a pair of supporting members with a resistor element held therebetween. The element may be constructed from several parts which may be joined together by welding and bent into a zigzag shape. The bent element is held on to the supporting members by clips at each of the bends and flanges at the joins, through which the supporting members extend. An electrical connection is made to each end of the element and insulating spacers isolate the element from the supporting members.

The need to weld parts together increases manufacturing time, and therefore cost, and welds may be liable to failure and may compromise reliability. In addition, there are now available resistor alloys which are cheaper than those previously available, and which have good temperature stability characteristics. However, some of these new alloys are not well adapted to welding.

The clips which are known to be used to hold resistor elements to the supporting members may have lugs which are crimped around the edges of the element. However, these have been found inadequately to hold the element which may, at the very least, slide in the clip, rub against the element edge and work loose.

Resistor banks in traction vehicles may be subject to intense mechanical stresses and vibrations which may, at the very least, cause flexing of the supporting members. Generally, insulating spacers for isolating the element from the supporting members are mounted end to end on each of the supporting members. The engaging faces of adjacent spacers are usually plane. In the event of large-scale flexure of the supporting members, adjacent spacers may effectively part company so that crevices are created therebetween. These crevices are vulnerable to the ingress of containments whose presence may compromise the electrically insulating property of the spacers.

EP-A-0676774 discloses a resistor bank having a first and second supporting members, a resistor element comprising a strip of resistor material which is bent into a zigzag shape and holding means for holding the element at a bend thereof on to a respective one of the supporting members. EP-A-0676774 also discloses insulating spacers for isolating the element from the supporting members.

SUMMARY OF THE INVENTION

The invention provides a resistor bank having first and second supporting members, a resistor element comprising a strip of resistor material which is bent into a zigzag shape, and holding means comprising a plurality of clips each for holding the element at a bend thereof on to a respective one of the supporting members, characterised in that each clip has at least one fastening lug for insertion into at least one fastening hole in a corresponding bend in the element.

Having clips with at least one lug which is received in a hole in a bend in the element provides much better integrity, in the sense of making a more rigid connection, between the element and a respective one of the supporting members in comparison to clips with lugs which crimp over the edges of the element. Also clips with lugs for insertion into holes provide much better lateral support than clips with lugs which crimp over the edges of the element, and there is no rubbing between the clip and the element edge, which can cause the clip to wear.

Each clip may extend around the narrower diameter section of one of the spacers. With the spacers arranged in an end to end fashion so that the wider diameter section of one spacer abuts the narrower diameter section of the adjacent spacer, the clip is restrained from lateral movement by the two neighbouring wider diameter sections.

The surface of the or each clip adjacent the or each lug which engages a corresponding bend in the element has substantially the same curvature as the corresponding bend. Having complimentarily curved bend engaging surfaces contributes to the integrity and the lateral support offered by the clip.

The clip may be of stainless steel.

Preferably, each clip has two fastening lugs and there are two fastening holes in the corresponding bend, one fastening hole for each fastening lug.

An advantage of having a continuous element, without any joins, is that the number of welds required in the construction of the bank is minimised (preferably only two to the element: one to each of two conductors, one at each end of the element), and production time and costs consequently benefit. In addition, a minimisation of welding facilitates the adoption of the more recently available, cheaper resistor alloys which do not weld easily or require specialist welding techniques. The element may be of NiCr or FeAlCr or any other suitable resistor alloy. The joins and any flanges in multi-part elements also provide a focus for arcing in use, so not having joins reduces the susceptibility to arcing.

A drawback of having a continuous element is the tendency of some alloy resistor materials to distort when exposed to high temperatures. This tendency to distort is commonly known as creepage. In a traction vehicle dynamic braking resistor system, temperatures may reach 700° C., which necessitates that the element should be as rigid as possible in order to resist the affects of creepage whilst allowing the gap between adjacent legs of the element to be minimised. Space is an important consideration for dynamic braking resistor systems which may comprise fifty resistor banks, and minimising the gap between adjacent legs of the element is a key factor in space considerations. Also to be borne in mind is that the effect of adjacent legs of the element contacting and causing a short circuit can be very damaging. However, rigidity of the element may be improved over and above that offered by a continuous element of planar cross sectional profile by having a non-planar cross sectional profile. The element is usually air cooled, and a non-planar cross sectional profile must not compromise air flow between the legs of the element. Preferably, the cross sectional profile of the element is of a shape whereby at least one region of the element protrudes further away from a datum than at least one other region of the element. Further preferably, one region protrudes in one direction away from the datum and two regions of the element protrude in an opposite direction away from the datum. Alternatively, a plurality of regions may protrude in one direction away from the datum and a plurality of regions may protrude in an opposite direction away from the datum.

The invention further provides a resistor bank having first and second supporting members, a resistor element comprising a strip or resistor material which is bent into a zigzag shape, insulator means comprising a plurality of insulating spacers for isolating the element from the supporting members mounted end to end on each of the first and second supporting members, characterised in that the engaging surfaces of adjacent spacers are of complimentary shapes thereby to enable each spacer to move relative to each adjacent spacer with any flexing of the relevant one of the first and second supporting members. Relative movement between adjacent spacers minimises the occurrence of crevices between the spacers. The relative movement also assists in reducing the friction between adjacent spacers. Such friction results in energy losses in the bank which are detrimental to its performance.

Preferably, the engaging surfaces of adjacent spacers are of complimentary curved shapes. Further preferably, the engaging surfaces are spherically curved. The radius of curvature of the engaging surfaces are selected so as to be substantially the same, although the radius may be so large that the surfaces are not discernibly curved.

The first and second supporting members may each comprise a cylindrical rod and each spacer may have a rod receiving bore so as to be slidably receivable on a respective one of the rods. Spring means may be provided to exert such a force as to urge the spacers together. Accordingly, the spacers are prevented from rattling together in use when the bank is subjected to vibrational stresses. Preferably, the force exerted by the spring means is maintained substantially constant despite the thermal expansion which occurs in use to the supporting members and/or spacers. Further preferably, the spring means comprises a coil spring, coiled around one of the supporting members.

Each spacer may comprise two substantially cylindrical sections each of different diameter and the spacers may be mounted whereby the narrower diameter section of each spacer abuts the wider diameter section of each adjacent spacer.

The insulator means may further comprise a layer of insulating material on each of the first and second supporting members, between the first and second supporting members and the spacers.

The spacers may be of ceramics materials, such as corderite ceramic, which provides electrical and heat insulation.

The invention also provides a resistor bank having first and second supporting members, a resistor element comprising a strip of resistor material which is bent into a zigzag shape, holding means comprising a plurality of clips each for holding the element at a bend thereof on to a respective one of the members, and insulating spacers for isolating the element from the supporting members mounted end to end on each of the first and second supporting members, characterised in that each clip has at least one fastening lug for insertion into at least one fastening hole in a corresponding bend in the element, and the engaging surface of adjacent spacers are of complimentary shapes thereby to enable each spacer to move relative to each adjacent spacer with any flexing of the relevant one of the first and second supporting members.

The invention will now be described, by way of example, with reference to the following drawings in which.

BRIEF DESCRIPTION OF THE DRAWINGS

DETAILED DESCRIPTION OF THE INVENTION

Figure 1:
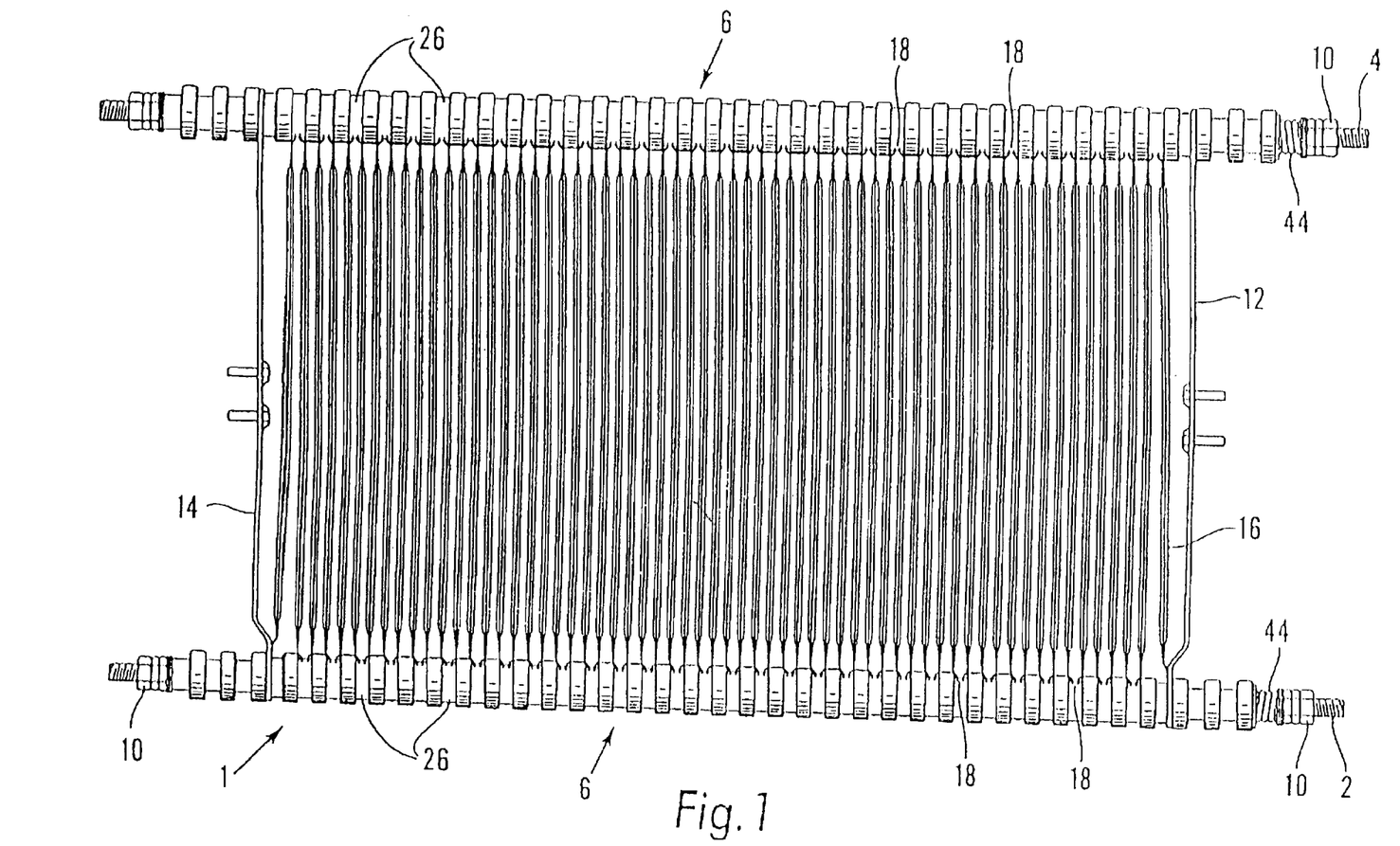
FIG. 1 is a side view of a resistor bank according to the invention for use in a traction vehicle dynamic braking resistor system.
Figure 5:
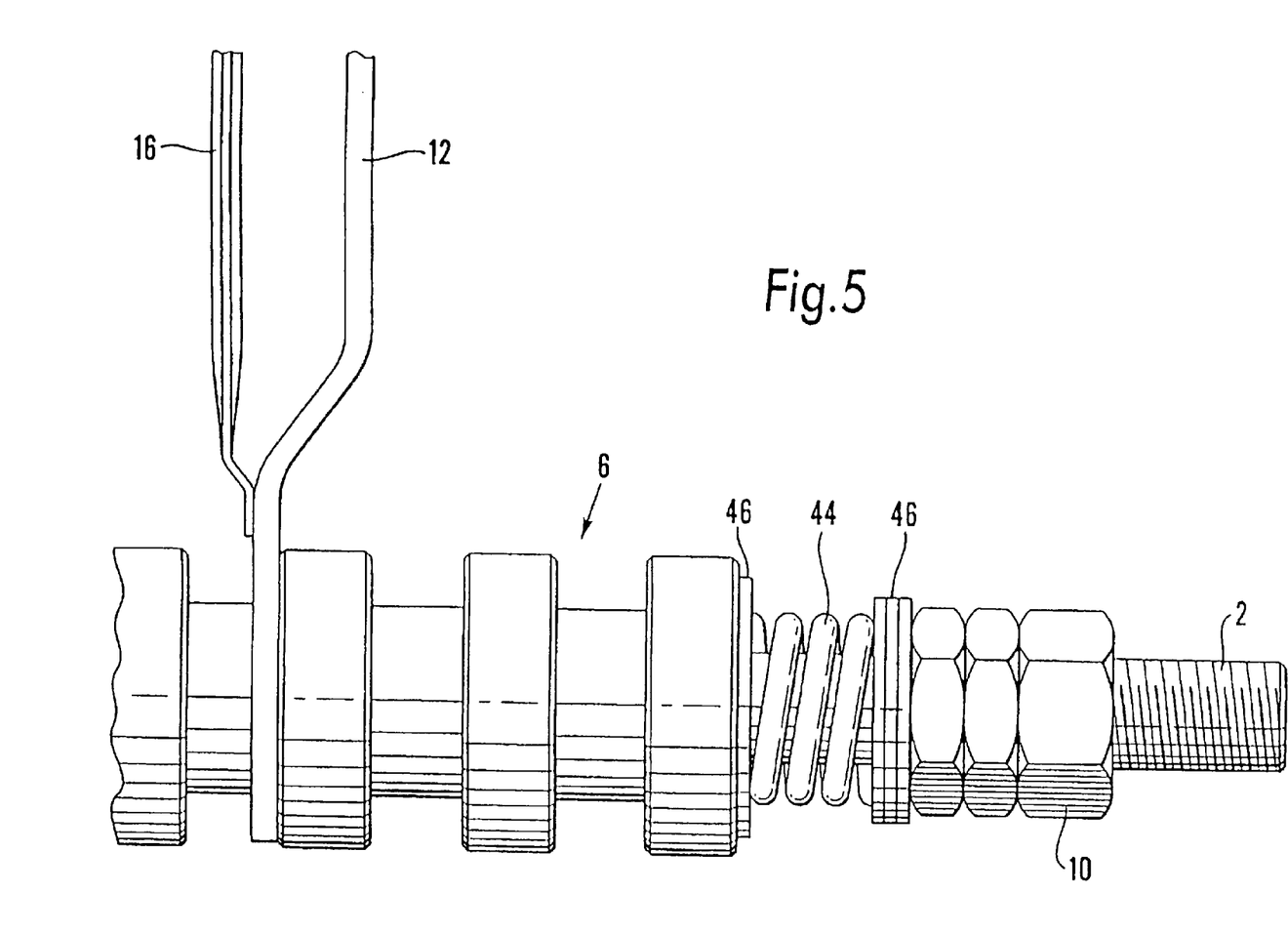
FIG. 5 is a side view of the end of one of the rods of the resistor bank shown in FIG. 1.
Figure 6:
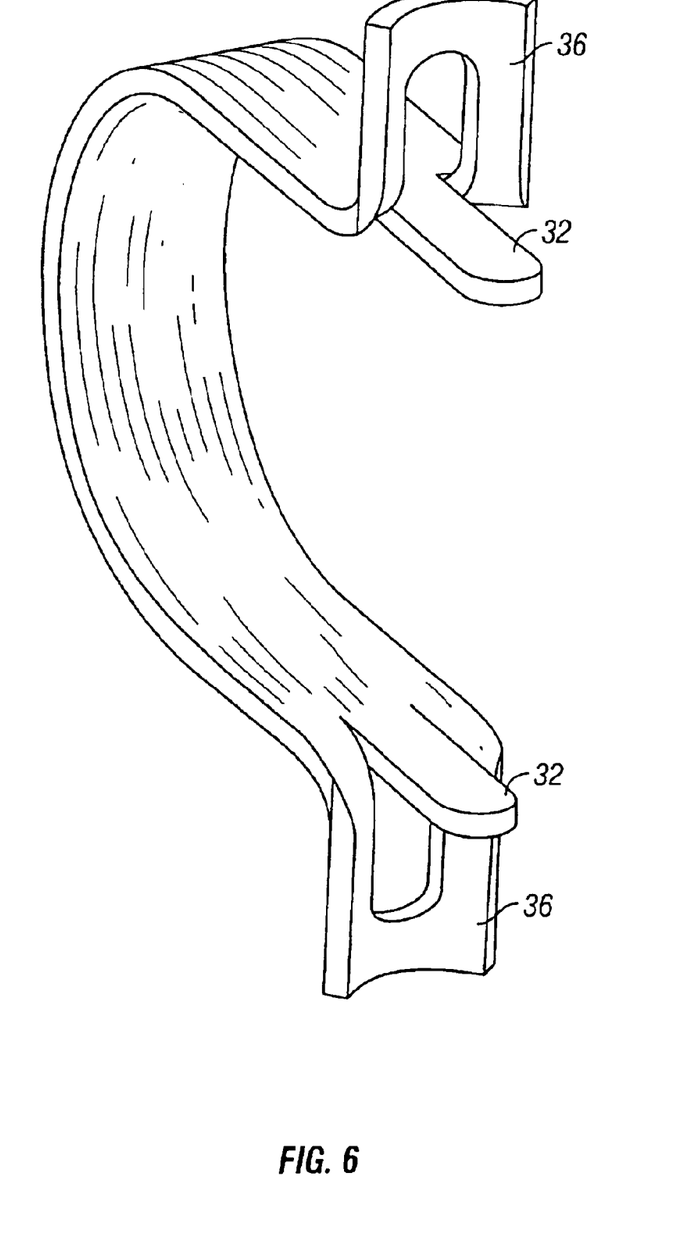
FIG. 6 is a perspective view of a holding clip used in the resistor bank.
Figure 7:
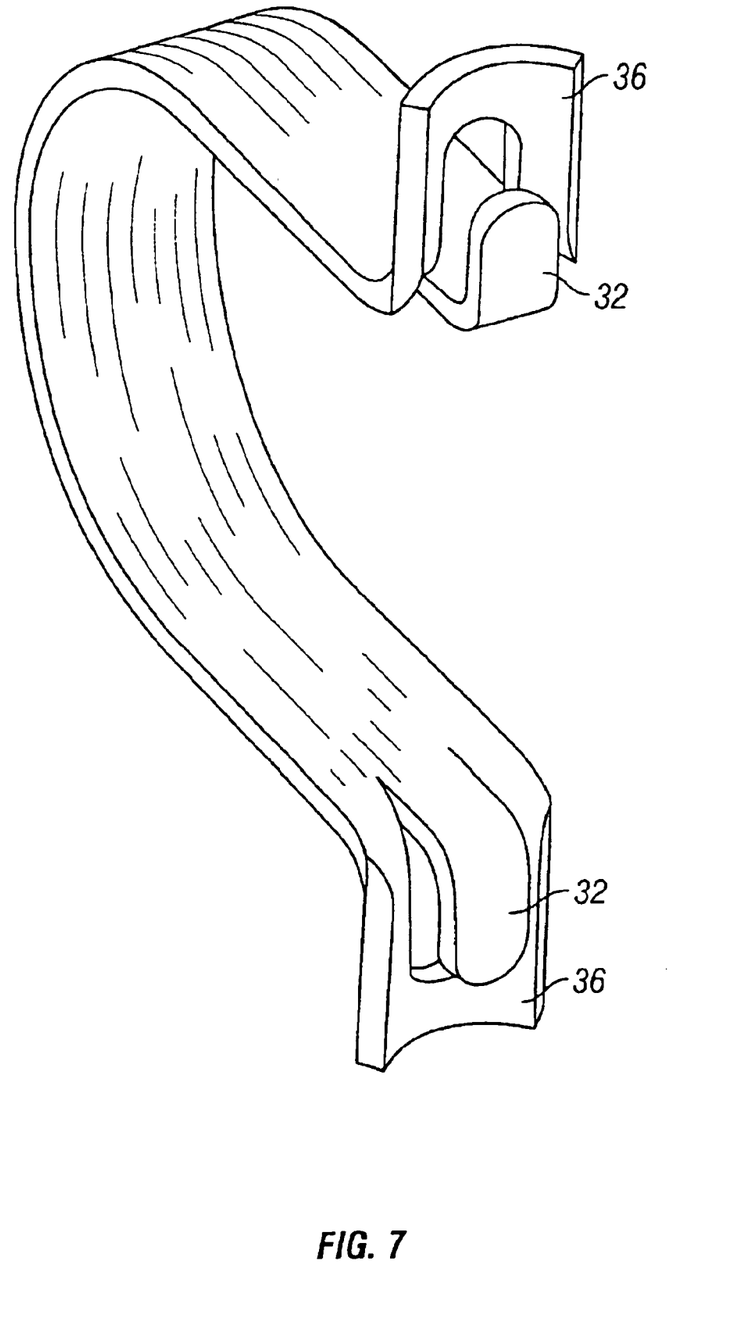
FIG. 7 is a perspective view of a holding clip fastened to the hairpin bend of the resistor element.
Figure 8:
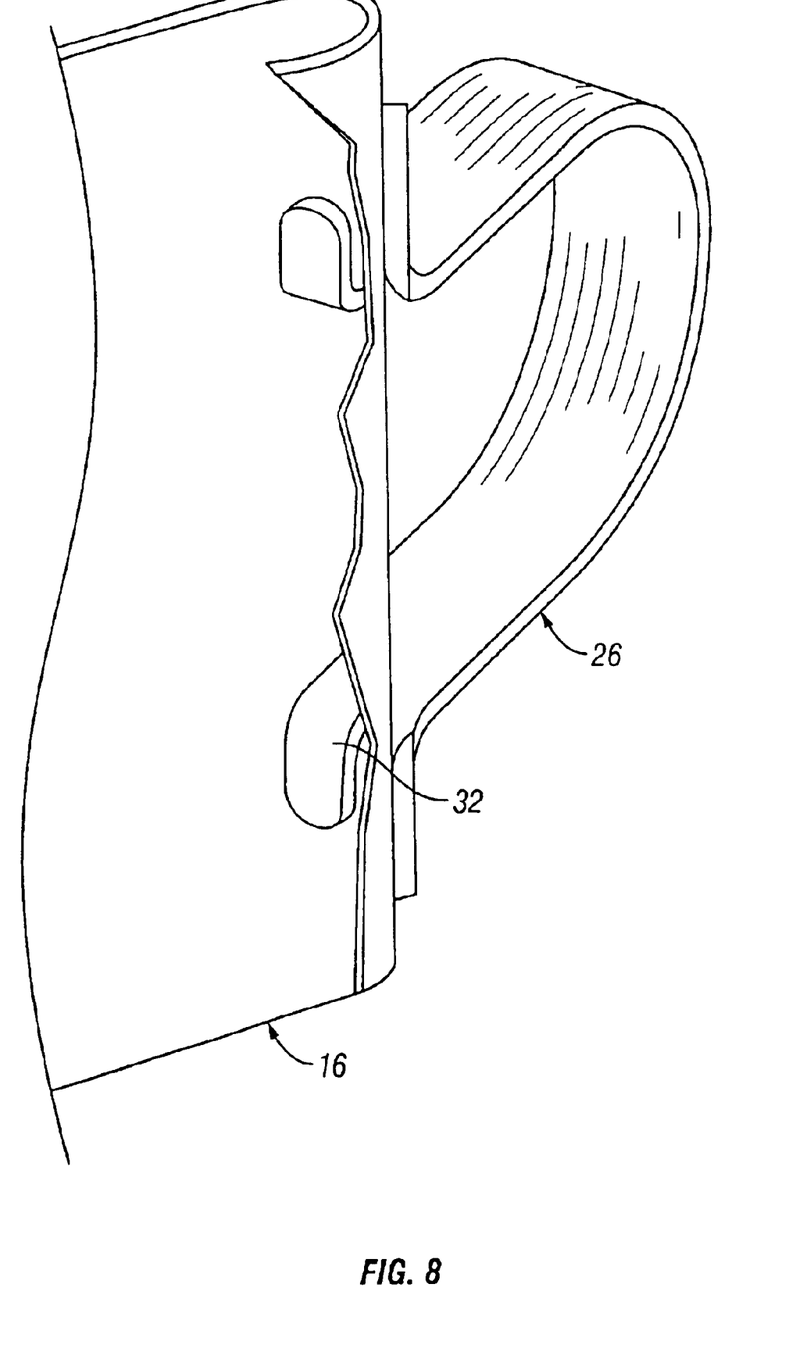
FIG. 8 is a perspective view of a holding clip fastened to the hairpin bend of the resistor element.
Figure 9:
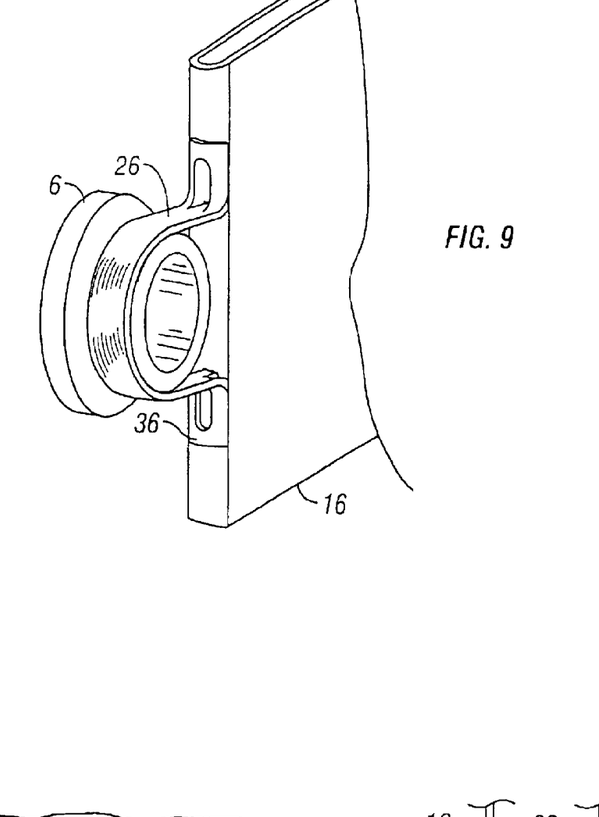
FIG. 9 is a perspective view of a holding clip fastened to the hairpin bend of the resistor element.
Figure 10:
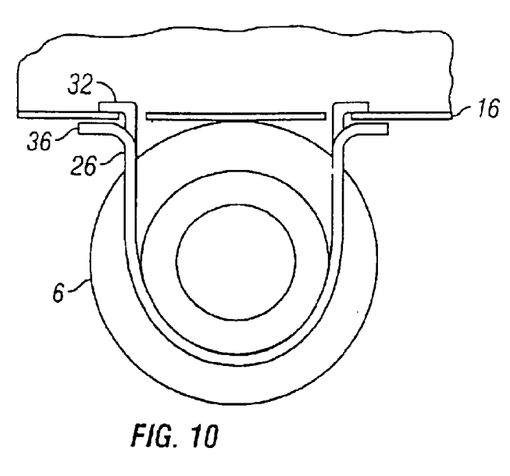
FIG. 10 is a side view of a holding clip fastened to the hairpin bend of the resistor element and wrapped around a spacer.
Figure 11:
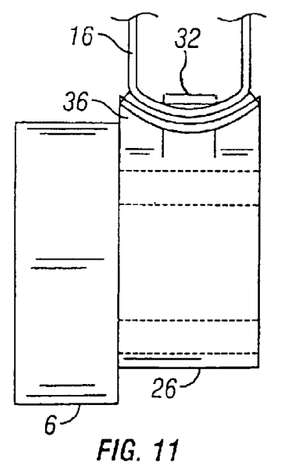
FIG. 11 is a top view of a holding clip fastened to the hairpin bend of the resistor element and wrapped around a spacer.

With reference to FIG. 1, a resistor bank for a traction vehicle dynamic braking resistor system is indicated generally at 1. The bank 1 comprises first and second supporting members 2, 4 in the form of cylindrical steel rods commonly known as tie rods. Over each of the rods 2, 4 is a thin tube of silicone bonded micanite (not shown) which provides insulation. Mounted on each of the rods 2, 4, over the micanite tube, are a plurality of ceramics material, insulating spacers 6 which are each "top hat" shaped, that is to say, each spacer 6 comprises two cylindrical sections 20, 22, each of different diameter (see FIGS. 2A and 2B). Each spacer 6 has a central, rod receiving bore 24 of a diameter slightly greater than the diameter of the rods 2, 4, and the spacers 6 are slidably received on the rods 2, 4. The spacers 6 are mounted end to end so that the wider cylindrical section 22 of one spacer 6 abuts the narrower cylindrical section 20 of the adjacent spacer 6. Nuts 10 are threaded on to threaded lengths at the ends of each rod 2, 4 to hold the insulators captive therebetween. Between the nuts 10 at one end of the rods 2, 4 respectively and the adjacent, outermost spacers 6, springs 44 are coiled around the rods 2, 4 respectively so as to exert an axial compression on the spacers 6 and urge them tightly together. One of the springs 44 is shown in greater detail in FIG. 5. Clearly, visible in FIG. 5 are spacer washers 46 between the spring ends and the nut 10 and the outermost spacer 6 respectively.

The rods 2, 4 are held spaced apart in parallel in a frame (not shown) which also holds other resistor banks (not shown) which together make up a resistor system. Extending between each end of the rod 2 and the corresponding end of the other rod 4 are conductors 12, 14. At each end of each conductor 12, 14 there is an aperture through which the relevant rod 2, 4 extends, and each conductor 12, 14 is held in place between two of the spacers 6. The conductors 12, 14 are selectively connected, that is, when braking is required, to the respective terminals of a traction vehicle motor (not shown).

Between the conductors 12, 14 is a resistor element 16 in the form of a continuous, that is, without join, strip of resistor alloy, such as 30/20 NiCr, which is bent into a zigzag shape so as to follow a serpentine course back and forth between the rods 2, 4. The element 16 is MIG welded at each end to a respective one of the conductors 12, 14. A plurality of clips 26 (see FIGS. 3A and 3B), one at each hairpin bend 18, hold the element 16 to a respective one of the rods 2, 4.

Figure 2A:
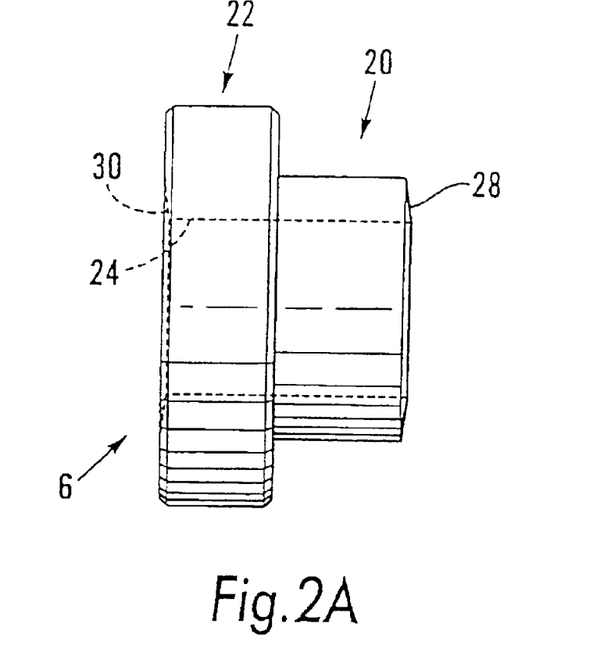
FIGS. 2A and 2B are side and narrower diameter end views respectively of an insulating spacer used in the resistor bank shown in FIG. 1.
Figure 2B:
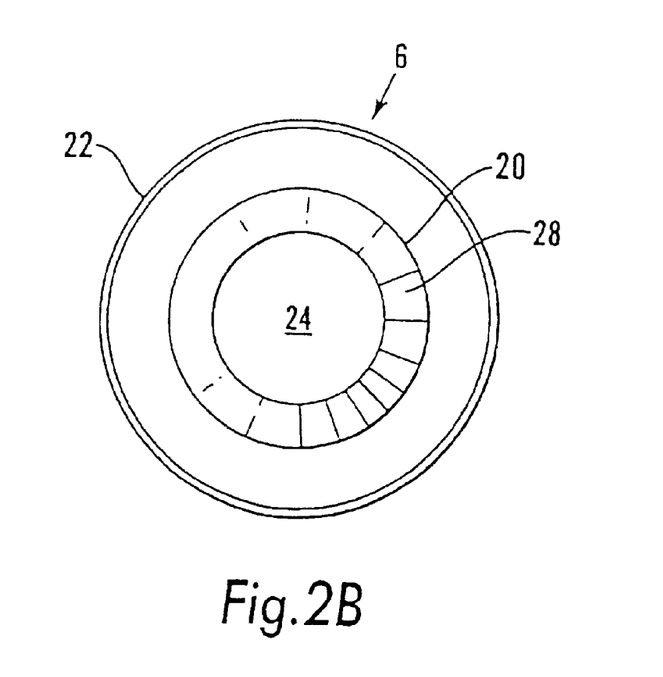

With reference also to FIG. 2, each spacer 6 is made from heat and electrically insulating corderite ceramic. The annular, end surface 28 of the narrower cylindrical section 20 of each spacer 6 is spherically curved. The end surface 30 around the bore 24 of wider cylindrical section 22 of the spacer 6 is also curved in a complimentary spherical fashion, with substantially the same radius of curvature. Thus, when mounted on the rods 2, 4 in an end to end manner, the complimentarily shaped surfaces 28, 30 of adjacent spacers 6 engage and mate together. The curvature of the mating surfaces 28, 30 enables adjacent spacers 6 to move relative to one another, in what is effectively a sliding motion, with the transverse flexing of the rods 2, 4 which occurs in use as a result of mechanical stresses. This movement occurs without exposing any crevices between adjacent spacers 6.

Figure 3A:
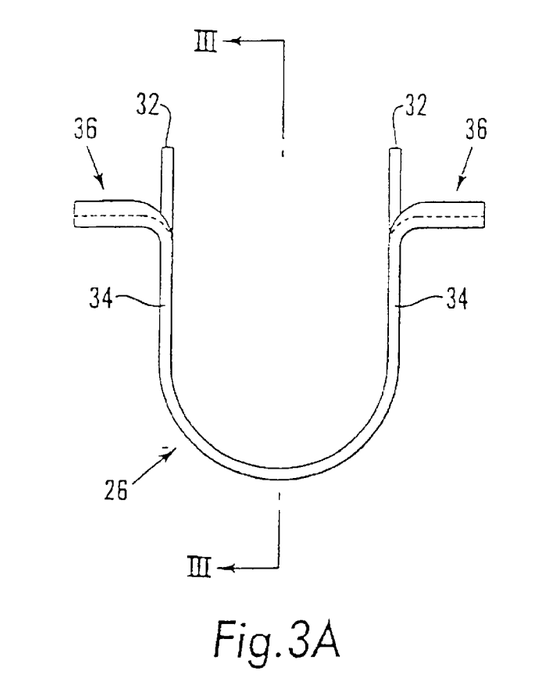
FIGS. 3A and 3B are side and cross sectional views (taken along line III—III) respectively of a holding clip used in the resistor bank shown in FIG. 1.
Figure 3B:
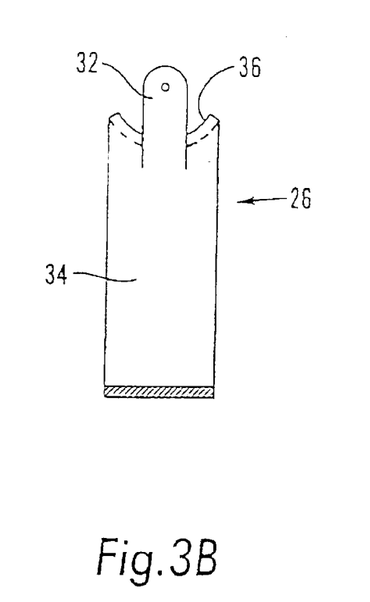

With reference also to FIG. 3, each clip 26 is generally U-shaped having (in the unused state) two lugs 32 which are a partial continuation of the legs 34 of the U. The remainder of the material which forms the continuation of the legs 34 is bent substantially perpendicularly to the lugs 32 to form element engaging surfaces 36. In use, the U of each clip fits around the narrower section 20 of a relevant spacer 6 and is restrained from lateral movement by the neighbouring wider sections 22. Each lug 32 is received in one of two holes in the corresponding hairpin bend 18 of the element 16. Thus, the element engaging surfaces 36 are brought in to contact with the corresponding hairpin bend 18. The element engaging surfaces 36 are saddle shaped, having substantially the same curvature as the hairpin bend 18 so that, with the lugs 32 bent back towards the element engaging surfaces 36 in the operating position, the clip 26 is fast and rigidly fixed to the element 16.

Figure 4A:
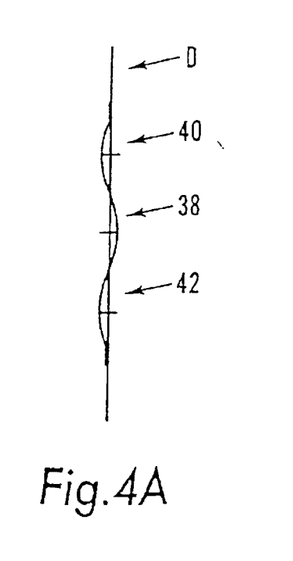
FIGS. 4A and 4B are alternative cross sectional profiles for a resistor element used in the resistor bank shown in FIG. 1.
Figure 4B:
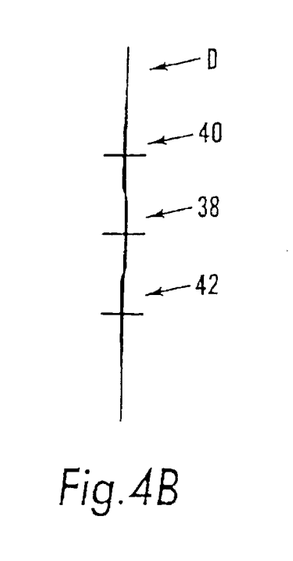

With reference also to FIG. 4, the element 16 does not have a planar cross sectional profile, but is shaped so as to improve upon the lack of rigidity of a plane profile. The element 16 is pressed such that, taking its original axis of symmetry as a datum D, a central region 38 of the element 16 protrudes in one direction away from the datum D and the peripheral regions 40, 42 to either side of the central region 38 protrude in an opposite direction away from the datum D. The transition from the maximum protrusion of one region to the maximum protrusion in the next region may be gradual, as in the example shown in FIG. 4a, or sudden, as in the example shown in FIG. 4b. The profile promotes rigidity in the element 16 without compromising cooling airflow between the adjacent legs of its serpentine course.

What is claimed is:

1. A resistor bank, comprising a resistor element formed by a strip of resistor material which is bent into a zigzag shape so as to have a plurality of bent regions at opposing sides, these bent regions each having at least one fastening hole formed therein, first and second supporting members disposed adjacent the respective opposing sides of the resistor element, insulating means mounted on each of the supporting members for isolating the element from the supporting members and holding means for holding the element at each bent region thereof on to a respective one of the supporting members, the improvement wherein the holding means comprises a plurality of generally U-shaped clips which fit around the insulating means on the supporting means, each clip having at least one fastening lug for insertion into the at least one fastening hole in a corresponding bent region of the element, wherein each clip also has a surface adjacent to each lug which is bent to substantially the same curvature as the corresponding bent region and wherein the element is securely retained by engagement of the respective lugs through the respective fastening holes followed by bending back of the lugs towards the adjacent curved surfaces.

2. A resistor bank according to claim 1 wherein the clip is of stainless steel.

3. A resistor bank according to claim 1 wherein each clip has two fastening lugs and there are two fastening holes in a corresponding bend in the element, one fastening hole for each fastening lug.

4. A resistor bank according to claim 1 having insulator means comprising a plurality of insulating spacers mounted end-to-end on each of the support members.

5. A resistor bank according to claim 4 wherein the engaging surfaces of adjacent spacers are of a complimentary shape thereby to enable each spacer to move relative to each adjacent spacer with any flexing of a relevant one of the supporting members.

6. A resistor bank according to claim 5 wherein the engaging surfaces of adjacent spacers are of complimentary curved shapes.

7. A resistor bank according to claim 6 wherein the engaging surfaces of adjacent spacers are spherically curved.

8. A resistor bank according to claim 7 wherein spring means is provided for urging the spacers on each supporting member together.

9. A resistor bank according to claim 8 wherein the first and second supporting members each comprise a cylindrical rod, and each spacer has a rod receiving bore.

10. A resistor bank according to claim 9 wherein each spacer comprises two substantially cylindrical sections each of different diameter and the spacers are mounted whereby the narrower diameter section of each spacer abuts the wider diameter section of each adjacent spacer.

11. A resistor bank according to claim 10 wherein each clip extends around the narrower diameter section of one of the spacers.

12. A resistor bank according to claim 11 wherein the insulator means further comprises a layer of insulating material on each of the first and second supporting members.

13. A resistor bank according to claim 12 wherein the spacers are of corderite ceramic or other ceramic materials.

14. A resistor bank according to claim 13 wherein the element is continuous and has a non-planar cross-sectional profile.

15. A resistor bank according to claim 14 wherein the cross-sectional profile of the element is of a shape whereby at least one region of the element protrudes further away from a datum than at least one other region of the element.

16. A resistor bank according to claim 15 wherein one region of the element protrudes in one direction away from the datum and two other regions of the element protrude in an opposite direction away from the datum.

17. A resistor bank according to claim 16 wherein the element is of NiCr or FeAlCr or another resistor alloy.

* * * * *

UNITED STATES PATENT AND TRADEMARK OFFICE
CERTIFICATE OF CORRECTION

PATENT NO. : 6,917,278 B1  
DATED : July 12, 2005  
INVENTOR(S) : Alwyn John Everitt It is certified that error appears in the above-identified patent and that said Letters Patent is hereby corrected as shown below:

Column 4,  
Line 21, delete ":" and insert -- ; --.  
Line 25, delete "," and insert -- ; --.  
Line 27, after "element" and before ";" insert -- and wrapped around a spacer --.

Signed and Sealed this

Thirteenth Day of September, 2005

JON W. DUDAS  
*Director of the United States Patent and Trademark Office*